United States Patent
Shahi et al.

(10) Patent No.: US 10,117,139 B1
(45) Date of Patent: Oct. 30, 2018

(54) TECHNIQUES AND APPARATUSES FOR IMPROVED NEIGHBOR SELECTION IN 5G CELLULAR SYSTEMS

(71) Applicant: QUALCOMM Incorporated, San Diego, CA (US)

(72) Inventors: Sharad Shahi, Boulder, CO (US); Bhaskara Viswanadham Batchu, Ameenpur Village (IN); Soumen Mitra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,053

(22) Filed: Sep. 19, 2017

(51) Int. Cl.
| | | |
|---|---|---|
| *H04W 36/00* | (2009.01) | |
| *H04W 48/12* | (2009.01) | |
| *H04W 36/30* | (2009.01) | |
| *H04W 48/16* | (2009.01) | |
| *H04W 72/08* | (2009.01) | |
| *H04W 48/20* | (2009.01) | |
| *H04W 16/14* | (2009.01) | |
| *H04B 7/08* | (2006.01) | |
| *H04W 74/00* | (2009.01) | |

(52) U.S. Cl.
CPC ....... *H04W 36/0061* (2013.01); *H04W 36/30* (2013.01); *H04W 48/12* (2013.01); *H04W 48/16* (2013.01); *H04W 48/20* (2013.01); *H04W 72/085* (2013.01); *H04B 7/0868* (2013.01); *H04W 16/14* (2013.01); *H04W 74/006* (2013.01)

(58) Field of Classification Search
CPC ............. H04W 36/0061; H04W 48/20; H04W 72/085; H04W 48/16; H04W 36/30; H04W 48/12; H04W 74/006; H04W 16/14; H04B 7/0868

USPC ......................................................... 455/436
See application file for complete search history.

(56) References Cited

U.S. PATENT DOCUMENTS

| | | | | |
|---|---|---|---|---|
| 8,559,344 | B2 * | 10/2013 | Abusch-Magder | ......................... H04W 36/0083 370/310 |
| 8,831,618 | B2 * | 9/2014 | Otte | .................. H04W 36/0061 370/332 |
| 9,247,444 | B2 * | 1/2016 | Drazynski | ............. H04W 24/10 |
| 9,294,974 | B2 * | 3/2016 | Kodali | .................. H04W 76/28 |

(Continued)

OTHER PUBLICATIONS

Vondra M., et al., "Distance-based Neighborhood Scanning for Handover Purposes in Network with Small Cells", IEEE Transactions on Vehicular Technology, vol. 65, No. 2, Jan. 2015, pp. 1-13.

*Primary Examiner* — Amancio Gonzalez
(74) *Attorney, Agent, or Firm* — Harrity & Harrity, LLP

(57) ABSTRACT

Certain aspects of the present disclosure generally relate to wireless communication. In some aspects, a base station may generate a second neighbor cell list based at least in part on information that identifies a location of a user equipment (UE) and a neighbor cell measurement report associated with a first neighbor cell list configured on the UE; determine a length of a measurement gap for a measurement, to be performed by the UE, based at least in part on the second neighbor cell list, wherein the length of the measurement gap is determined based at least in part on a serving cell measurement report associated with the UE; and provide, to the UE, the second neighbor cell list and information that identifies the length of the measurement gap. Numerous other aspects are provided.

30 Claims, 9 Drawing Sheets

(56) References Cited

U.S. PATENT DOCUMENTS

| | | | |
|---|---|---|---|
| 9,313,673 B2* | 4/2016 | Cheekatla | H04W 24/02 |
| 9,888,490 B2* | 2/2018 | Wang | H04W 72/1263 |
| 2010/0190496 A1* | 7/2010 | Chinnathambi | H04W 36/0061 |
| | | | 455/435.1 |
| 2011/0319086 A1* | 12/2011 | Katori | H04W 48/08 |
| | | | 455/440 |
| 2013/0242796 A1* | 9/2013 | Chen | H04W 36/0088 |
| | | | 370/252 |
| 2014/0045505 A1* | 2/2014 | Henry | H04W 36/0061 |
| | | | 455/444 |
| 2016/0014692 A1* | 1/2016 | Kim | H04W 52/0216 |
| | | | 370/252 |
| 2016/0029253 A1* | 1/2016 | Sarkar | H04W 36/0016 |
| | | | 455/436 |
| 2017/0055186 A1* | 2/2017 | Donepudi | H04W 4/029 |

* cited by examiner

TECHNIQUES AND APPARATUSES FOR IMPROVED NEIGHBOR SELECTION IN 5G CELLULAR SYSTEMS

FIELD OF THE DISCLOSURE

Aspects of the present disclosure generally relate to wireless communication, and more particularly to techniques and apparatuses for improved neighbor selection in a cellular system, such as a fifth generation (5G) cellular system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include generating a second neighbor cell list based at least in part on information that identifies a location of a user equipment (UE) and a neighbor cell measurement report associated with a first neighbor cell list configured on the UE; determining a length of a measurement gap for a measurement, to be performed by the UE, based at least in part on the second neighbor cell list, wherein the length of the measurement gap is determined based at least in part on a serving cell measurement report associated with the UE; and providing, to the UE, the second neighbor cell list and information that identifies the length of the measurement gap.

In some aspects, a user equipment for wireless communication may include one or more processors configured to generate a second neighbor cell list based at least in part on information that identifies a location of a UE and a neighbor cell measurement report associated with a first neighbor cell list configured on the UE; determine a length of a measurement gap for a measurement, to be performed by the UE, based at least in part on the second neighbor cell list, wherein the length of the measurement gap is determined based at least in part on a serving cell measurement report associated with the UE; and provide, to the UE, the second neighbor cell list and information that identifies the length of the measurement gap.

In some aspects, a non-transitory computer-readable medium may store one or more instructions for wireless communication. The one or more instructions, when executed by one or more processors of a user equipment, may cause the one or more processors to generate a second neighbor cell list based at least in part on information that identifies a location of a UE and a neighbor cell measurement report associated with a first neighbor cell list configured on the UE; determine a length of a measurement gap for a measurement, to be performed by the UE, based at least in part on the second neighbor cell list, wherein the length of the measurement gap is determined based at least in part on a serving cell measurement report associated with the UE; and provide, to the UE, the second neighbor cell list and information that identifies the length of the measurement gap.

In some aspects, an apparatus for wireless communication may include means for generating a second neighbor cell list based at least in part on information that identifies a location of a UE and a neighbor cell measurement report associated with a first neighbor cell list configured on the UE; means for determining a length of a measurement gap for a measurement, to be performed by the UE, based at least in part on the second neighbor cell list, wherein the length of the measurement gap is determined based at least in part on a serving cell measurement report associated with the UE; and means for providing, to the UE, the second neighbor cell list and information that identifies the length of the measurement gap.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
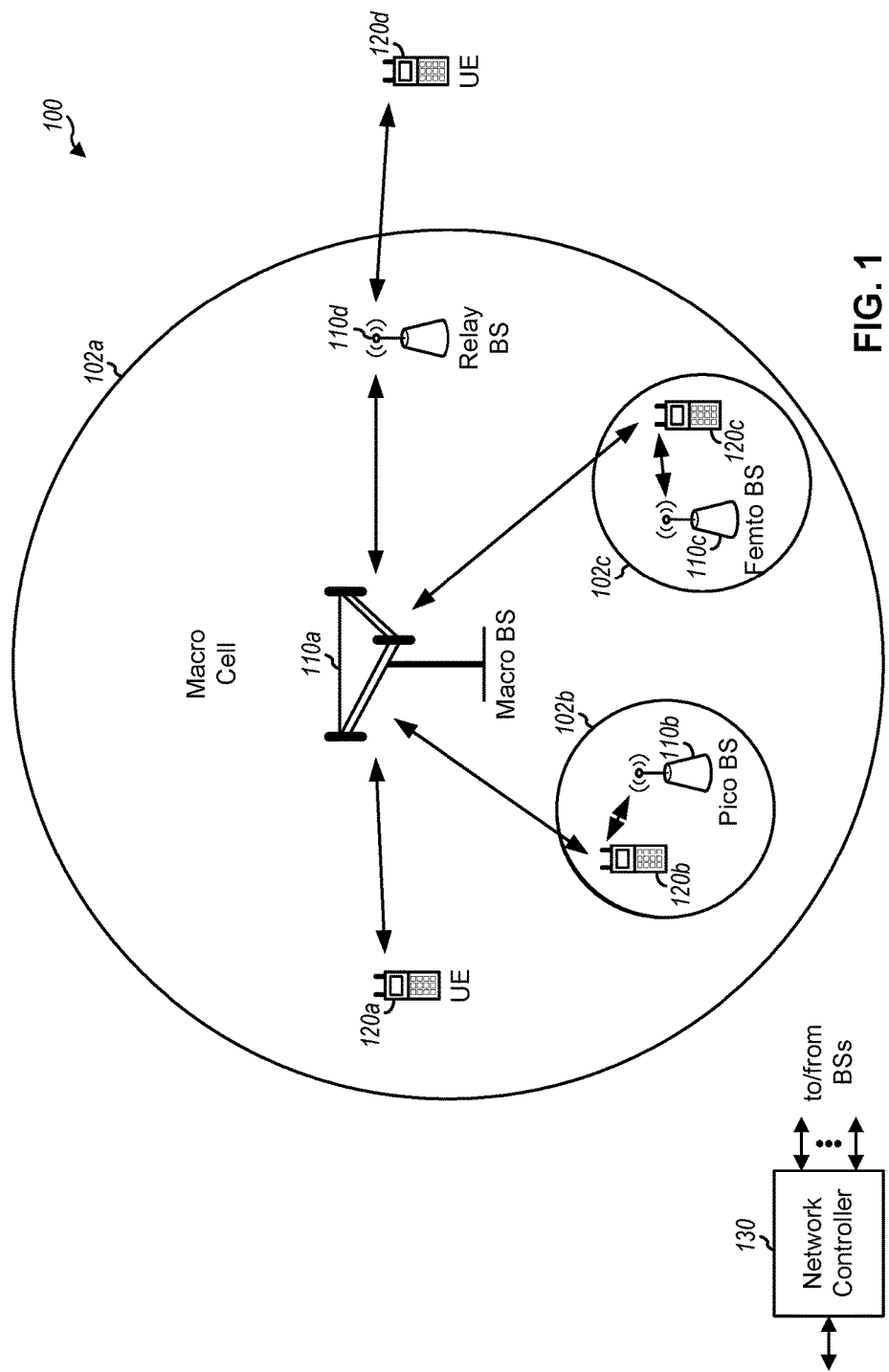
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing 120' that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
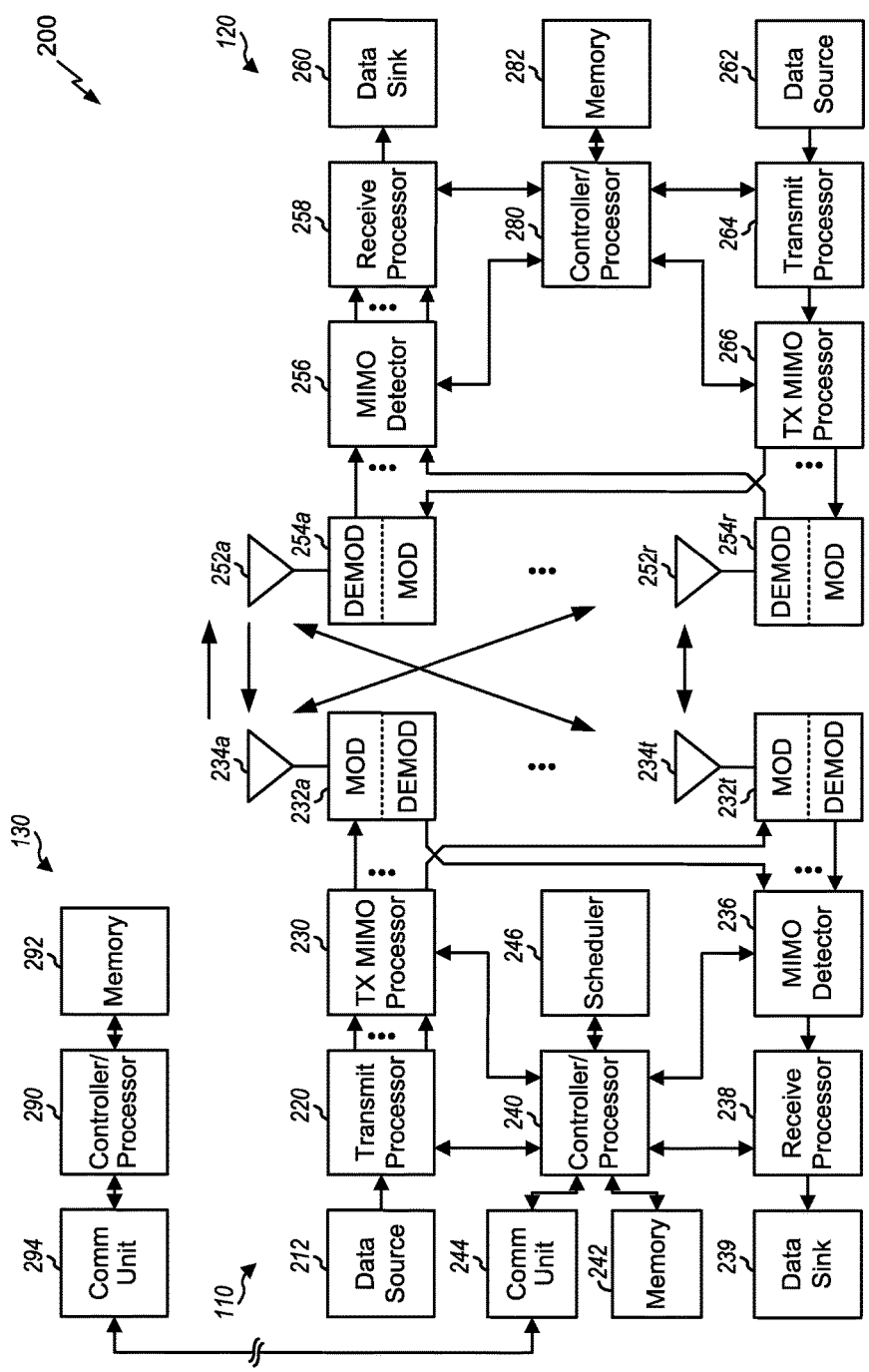
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform operations associated with improved neighbor selection in a cellular system, such as a 5G system. For example, controller/processor 240 and/or other processors and modules at BS 110, may perform or direct operations of BS 110 to perform improved neighbor selection in a cellular system, such as a 5G cellular system. For example, controller/processor 240 and/or other controllers/processors and modules at BS 110 may perform or direct operations of, for example, process 800 of FIG. 8, and/or other processes as described herein. As another example, controller/processor 280 and/or other processors and modules at UE 120, may perform or direct operations of UE 120 to perform improved neighbor selection in a cellular system, such as a 5G cellular system. For example, controller/processor 280 and/or other controllers/processors and modules at UE 120 may perform or direct operations of, for example, processes as described herein. In some aspects, one or more of the components shown in FIG. 2 may be employed to perform example process 800 and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
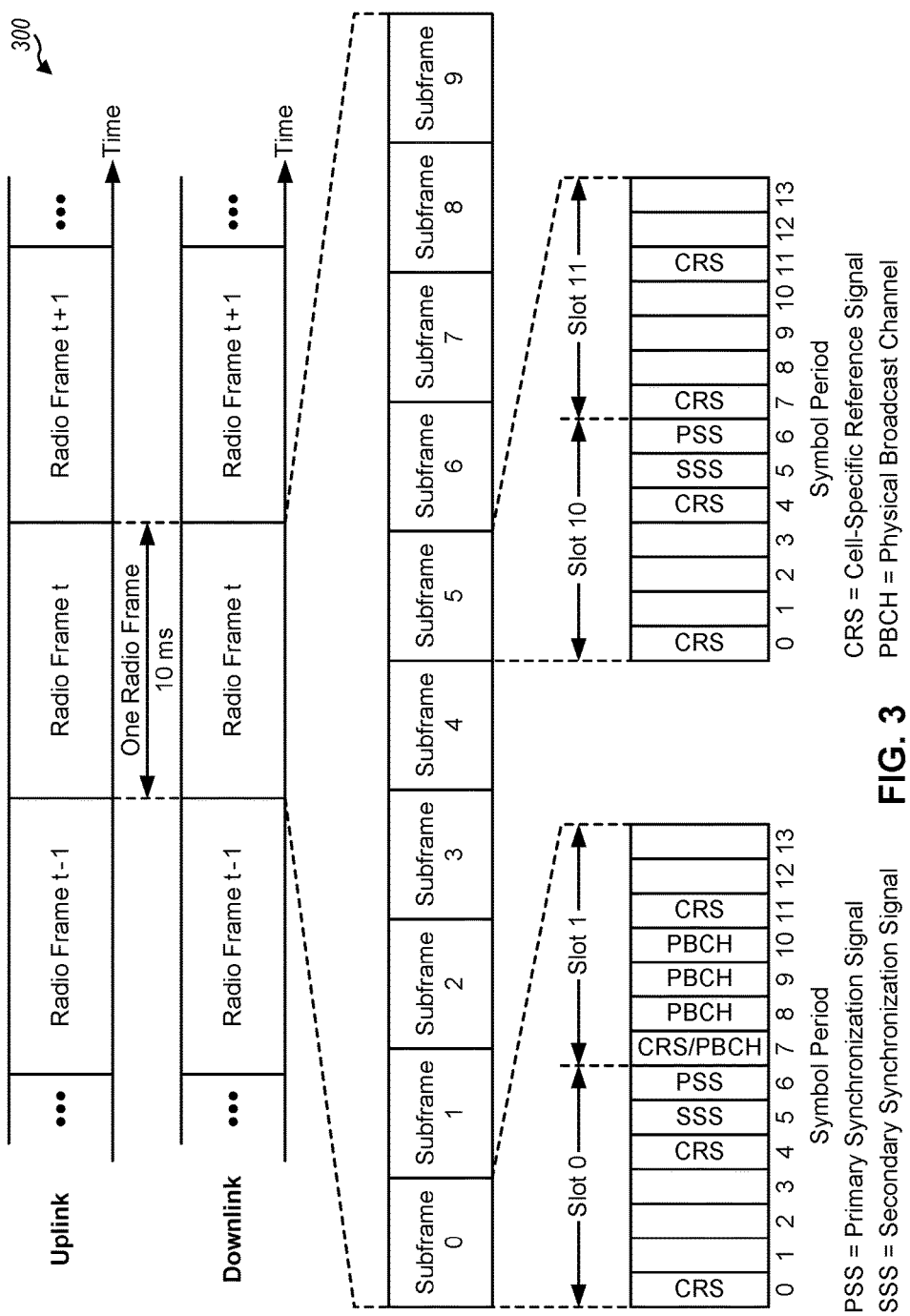
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
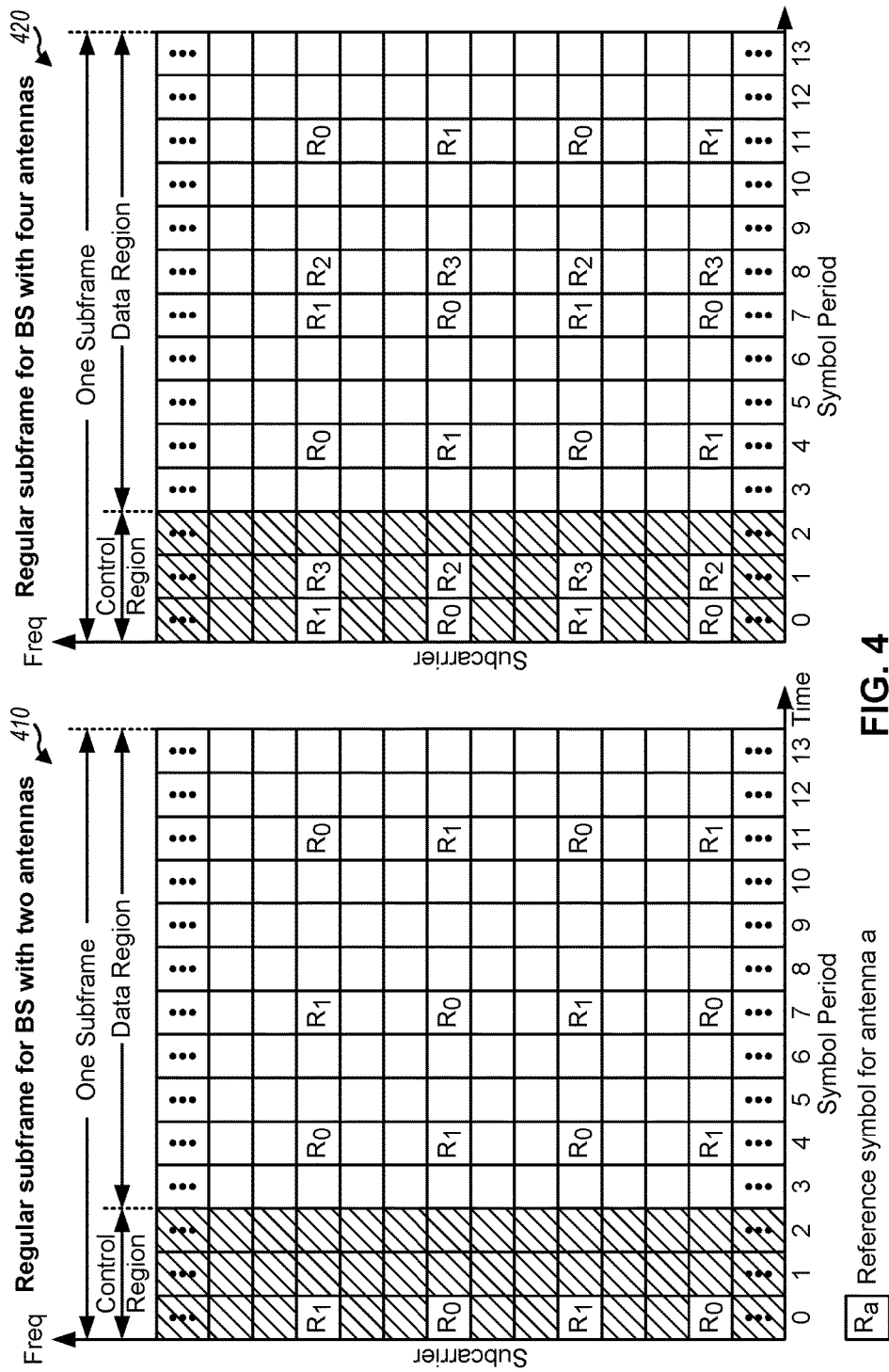
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
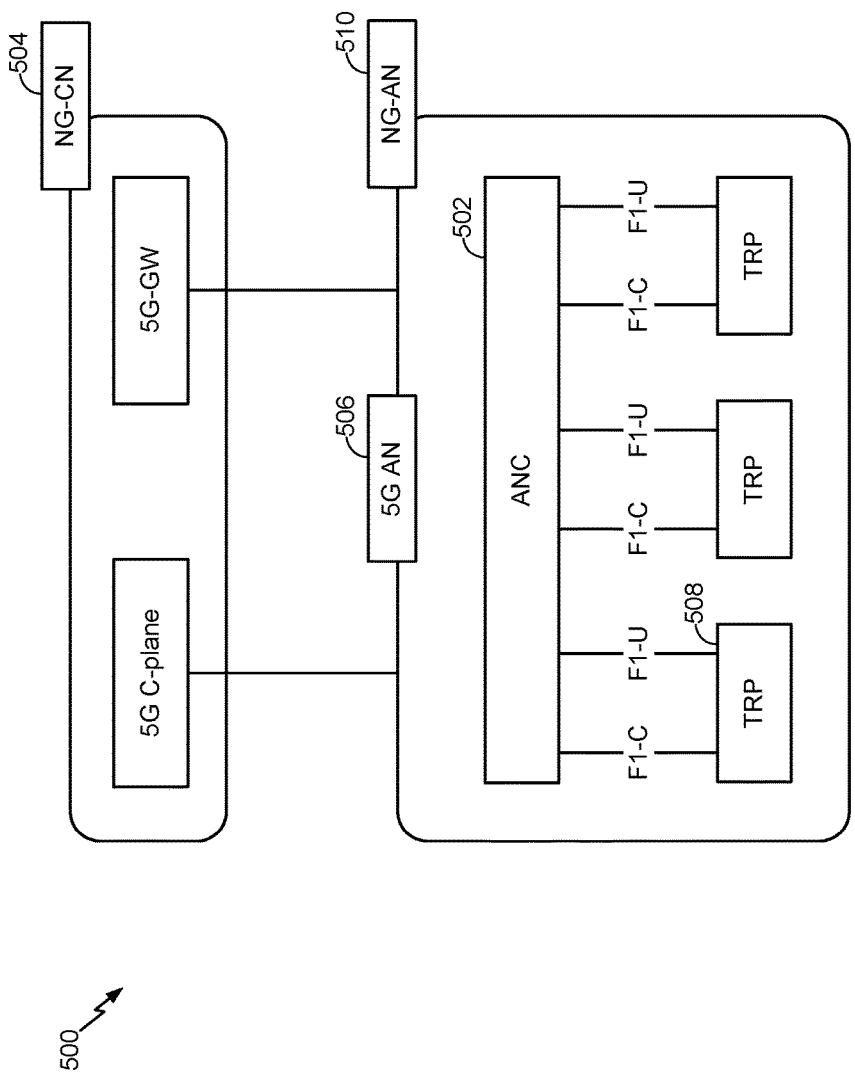
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
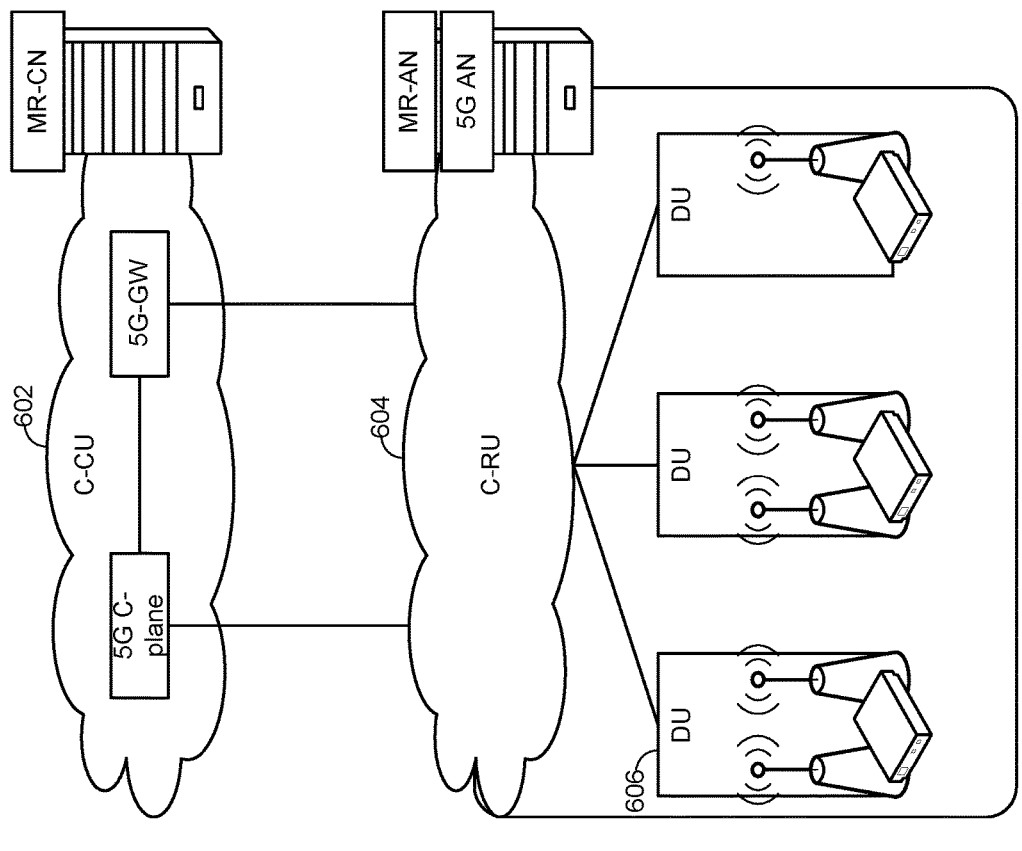
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

A UE may be configured to initiate performance of a neighbor selection process associated selecting a cell, within a cellular system (e.g., a 5G cellular system), via which the UE may communicate. For example, when connected to a serving cell (e.g., a cell covered by a particular base station in which the UE is located), a UE may be configured to (e.g., periodically) initiate a process associated with determining whether the UE is to remain connected to the serving cell, or should switch to a neighbor cell (e.g., another cell served by the particular base station, another cell served by another base station) for coverage. This process may be referred to as a neighbor cell search.

In a typical case, the UE is configured with a neighbor cell list that identifies a set of neighbor cells (and an order of priority associated with scanning channels associated with the set of neighbor cells). Here, the UE may scan channels associated with one or more neighbor cells identified in the neighbor cell list, during a time window that the UE is not transmitting or receiving data via the cellular network (herein referred to as a measurement gap). Based at least in part on a result of the scan (e.g., signal strengths, signal qualities, and/or the like, associated with the one or neighbor cells) and a measurement associated with the serving cell, a determination may be made as to whether the UE should remain connected to the serving cell or to switch to a neighbor cell. As a particular example, if a particular neighbor cell may provide better coverage than the serving cell (e.g., if a signal quality of the particular neighbor cell is better than that of the serving cell), then the UE may attempt to initiate a handover to the neighbor cell.

Generally, the UE receives the neighbor cell list and information associated with the measurement gap (e.g., a length of the measurement gap, a periodicity of the measurement gap, and/or the like) from the base station, associated with the serving cell, when the UE attaches to or connects to the cellular network. As such, the neighbor cell list and/or the measurement gap may be relatively static after configuration by the base station.

Such a solution may be acceptable for a cellular network in which channel conditions are relatively consistent in terms of signal strength and/or signal quality. For example, in such channel conditions, a signal strength and/or a signal quality of a given cell may be relatively stable and/or resistant to disruption. As such, updating and/or modifying the neighbor cell list (e.g., changing an order of priority of the neighbor cells, adding or removing neighbor cells, and/or the like) and/or modifying the measurement gap (e.g., the length, the periodicity, and/or like) may not provide a notable improvement in performance associated with the cellular network (e.g., in terms of data throughput, faster cell reselection, prevention of dropped calls, and/or the like).

However, the above described solution is not suitable for a cellular system with comparatively variable channel conditions (e.g., channel conditions that are susceptible to disruption). For example, some techniques implemented in a 5G cellular network (e.g., beamforming using millimeter wave technology) may result in variable channel conditions that can affect performance associated with the cellular network. Further, as a number of devices connected to the cellular network increases (as expected in 5G cellular networks), variability of the channel conditions may further increase.

In such cases, the neighbor cell selection process becomes an important consideration in terms of achieving acceptable and/or improved performance. For example, with the possibility of variable channel conditions based at least in part on the location of the UE, it may be desirable to update the neighbor cell list (e.g., reprioritize an order associated with measuring the neighbor cells) based at least in part on a location of the UE. As another example, it may be desirable to use a comparatively longer measurement gap under poor channel conditions in order to prevent a connection from being interrupted (e.g., in order to ensure that a call is not dropped and/or facilitate faster cell reselection). As another example, it may be desirable to use a comparatively shorter measurement gap under good channel conditions in order to improve throughput at the UE (e.g., since the likelihood of a call drop is reduced, a handover is less likely to be needed).

Some aspects described herein provide techniques and apparatuses for improved neighbor selection in a cellular system. For example, techniques and apparatuses described herein may provide improved neighbor cell selection in a cellular system in which variable channel conditions may be expected (e.g., a 5G cellular system). In some aspects, such improved neighbor cell selection may be achieved by updating and/or modifying a neighbor cell list and/or a measurement gap, configured on a UE, based at least in part on measurement reports, provided by the UE, and a location of the UE, as described in further detail below.

Figure 7A:
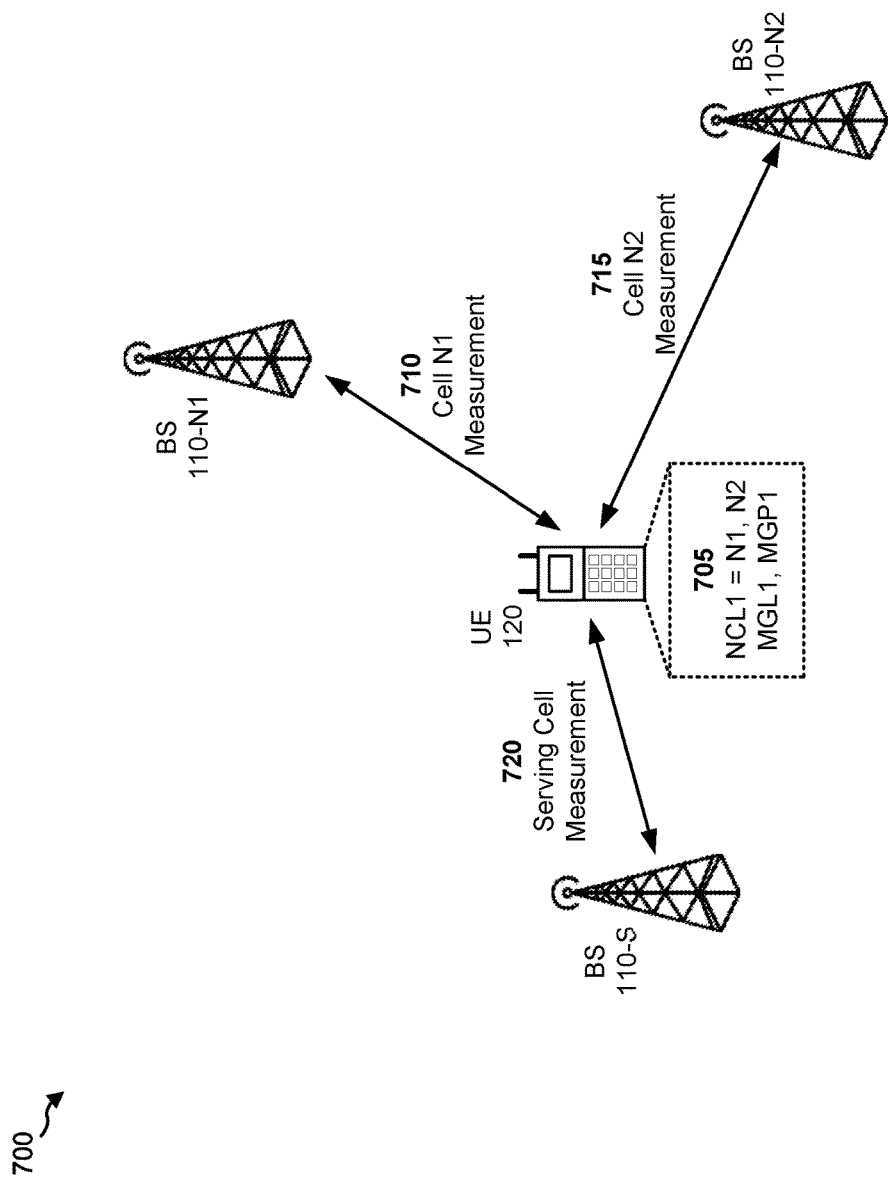
FIGS. 7A and 7B are diagrams illustrating an example of improved neighbor cell selection in a cellular system, such as a 5G system, in accordance with various aspects of the present disclosure.
Figure 7B:
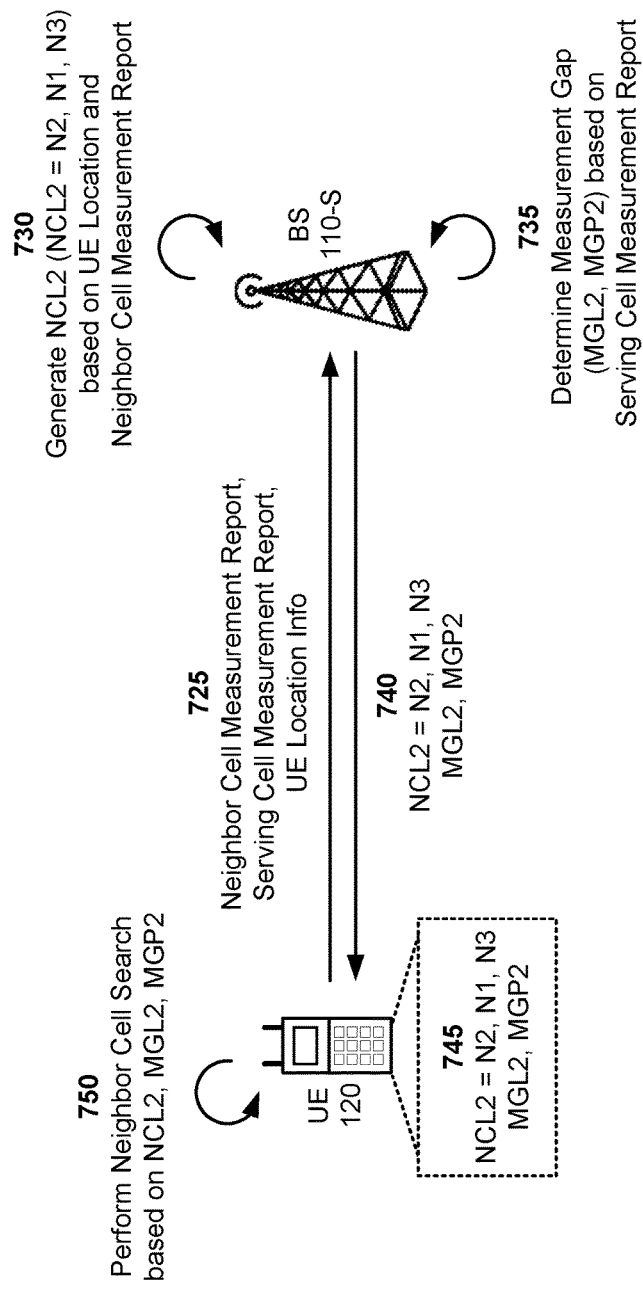

FIGS. 7A and 7B are diagrams illustrating an example 700 of improved neighbor selection in a cellular system, such as a 5G cellular system, in accordance with various aspects of the present disclosure.

As shown by FIG. 7A, and by reference number 705, UE 120 has been configured (e.g., by BS 110-S associated with a serving cell) with a first neighbor cell list (NCL1) that identifies a first neighbor cell (e.g., N1 served by BS 110-N1) and a second neighbor cell (e.g., N2 served by BS 110-N2). As shown, the first neighbor cell is prioritized over the second neighbor cell for the purposes of performing a neighbor cell search (i.e., UE 120 will search for a signal associated with cell N1 before searching for a signal associated with cell N2 during a neighbor cell search). As further shown, UE 120 has been configured to perform such neighbor cell searches, in accordance with the first neighbor cell list, during measurement gaps configured by BS 110-S, where a periodicity of the measurement gaps is a first periodicity (MGP1) and where a given measurement gap has a first length (MGL1).

As further shown in FIG. 7A, UE 120 may perform measurements associated with the neighbor cells (e.g., N1 and N2) and the serving cell. For example, as shown by reference number 710, UE 120 may measure a signal characteristic (e.g., a signal strength, a signal quality, and/or the like) associated with cell N1. Similarly, as shown by reference number 715, UE 120 may measure a signal characteristic of associated with cell N2.

As shown by reference number 720, UE 120 may also perform a measurement associated with the serving cell. For example, UE 120 may measure a signal characteristic associated with the serving cell.

In some aspects, UE 120 may measure the signal characteristics, associated with one or more neighbor cells and/or the serving cell, during a measurement gap configured on UE 120, periodically based at least in part on a configuration of UE 120, based at least in part on a request or command provided by BS 110-S, and/or the like.

As shown by FIG. 7B, and by reference number 725, UE 120 may provide, to BS 110-S, a neighbor cell measurement report, a serving cell measurement report, and information that identifies a location of UE 120.

In some aspects, the neighbor cell measurement report may include information associated with the signal characteristics of the neighbor cell measured by UE 120. For example, the neighbor cell measurement report may include information that identifies a neighbor cell and information that indicates a signal strength and/or a signal quality associated with the neighbor cell. In some aspects, the neighbor cell measurement report may include information associated with multiple neighbor cells. For example, in example 700, the neighbor cell measurement report may include information associated with signal characteristics of cell N1 and signal characteristics of cell N2.

In some aspects, the serving cell measurement report may include information associated with the signal characteristics of the serving cell measured by UE 120. For example, the serving cell measurement report may include information that indicates a signal strength and/or a signal quality of associated with the serving cell.

In some aspects, the information that identifies the location of UE 120 may include information that identifies a location of UE 120 (e.g., a particular location within the serving cell). For example, the information that identifies the location may include a set of coordinates that identifies the location of UE 120, information that identifies a region or sub-region within the serving cell, and/or the like.

In some aspects, UE 120 may (e.g., automatically) provide the neighbor cell measurement report, the serving cell measurement report, and the information that identifies the location of UE 120 after UE 120 measures the signal characteristics associated with the neighbor cells and the signal characteristics of the serving cell. In some aspects, UE 120 may provide the neighbor cell measurement report, the serving cell measurement report, and the information that identifies the location of UE 120 in single transmission to BS 110-S (e.g., in the form of a tuple). Alternatively, UE 120 may provide the neighbor cell measurement report, the serving cell measurement report, and/or the information that identifies the location of UE 120 in two or more separate transmissions to BS 110-S.

As shown by reference number 730, BS 110-S may generate a second neighbor cell list (e.g., an updated neighbor list, a modified neighbor list, and/or the like, identified as NCL2 in FIG. 7B) for UE 120.

In some aspects, BS 110-S may generate the second neighbor cell list based at least in part on the information that identifies the location of UE 120. For example, BS 110-S may determine, based at least in part on information stored or accessible by BS 110-S, information that identifies a set of locations corresponding to the set of neighbor cells associated with the first neighbor cell list (e.g., cell N1 and cell N2) and/or a set of neighbor cells not included in the first neighbor cell list (e.g., a cell N3 served by another BS 110, not shown). Here, BS 110-S may determine, based at least in part on the information that identifies the locations of the neighbor cells and the information that identifies the location of UE 120, distances between UE 120 and each of the neighbor cells. In this example, BS 110-S may generate the second neighbor cell list such that neighbor cells that are closer to UE 120 or at or within a threshold distance of UE 120 are to receive higher priority during a neighbor cell search (e.g., as compared to those that are further from UE 120 or outside of the threshold distance).

In some aspects, generating the second neighbor cell list based at least in part on the location of UE 120 may improve the neighbor cell search process by, for example, causing cells that are more likely to be candidates for reselection or handover (e.g., cells closer to UE 120) to be prioritized over other cells, which may reduce an amount of time needed for the neighbor cell search, reduce an amount of resources (e.g., processing resources, network resources, and/or the like) needed to perform the neighbor cell search, and/or the like.

Additionally, or alternatively, BS 110-S may generate the second neighbor cell list based at least in part on the neighbor cell measurement report. For example, BS 110-S may determine, based at least in part the neighbor cell measurement report, the signal characteristics associated with each of the neighbor cells measured by UE 120. Here, BS 110-S may generate the second neighbor cell list such that neighbor cells with comparatively better signal characteristics (e.g., cells with comparatively higher signal strengths and/or signal qualities, cells with signal strengths and/or signal qualities that satisfy a threshold, and/or the like) are to receive higher priority during a neighbor cell search (e.g., as compared to those with comparatively lower signal strengths and/or signal qualities, or those with signal strengths and/or signal qualities that do not satisfy the threshold).

In some aspects, generating the second neighbor cell list based at least in part on the neighbor cell measurement report may improve the neighbor cell search process by, for example, causing cells that are more likely to be candidates for reselection or handover (e.g., cells with better and/or acceptable signal characteristics) to be prioritized over other cells, which may reduce an amount of time needed for the neighbor cell search, reduce an amount of resources needed to perform the neighbor cell search, and/or the like.

In some aspects, BS 110-S may generate the second neighbor cell list based at least in part on the information that identifies the location of UE 120 and the neighbor cell measurement report. For example, BS 110-S may determine a neighbor cell score, associated with each of the set of neighbor cells measured by UE 120 and/or another set of neighbor cells not identified in the first neighbor cell list. Here, a given score, corresponding to a particular neighbor cell, may represent a combination (e.g., an average, a weighted average, and/or the like) of the distance from UE 120 to the particular cell and one or more signal characteristics associated with the particular cell (if available). In this example, BS 110-S may generate the second neighbor cell list such that neighbor cells with comparatively better neighbor cell scores (e.g., cells with higher neighbor cell scores and/or neighbor cell scores that satisfy a threshold) are to receive higher priority during a neighbor cell search (e.g., as compared to those with comparatively lower neighbor cell scores and/or scores that do not satisfy the threshold).

In some aspects, BS 110-S may generate the second neighbor cell list based at least in part on information associated with UE 120, as described above. Additionally, or alternatively, BS 110-S may generate the second neighbor cell list based at least in part on information associated with one or more other UEs 120. For example, BS 110-S may store or have access to information that identifies locations of one or more other UEs 120 (e.g., information previously received by BS 110-S) for which BS 110-S has already generated one or more other corresponding neighbor cell lists. In this example, BS 110-S may identify, based at least in part on the location of UE 120 and the locations of the one or more other UEs 120, one of the other UEs 120 that is or was closest to UE 120 or within a threshold distance of UE 120. Here, BS 110-S may generate the second neighbor cell list based at least in part on a neighbor cell list generated for the other UE 120 (e.g., BS 110-S may generate a same or similar second neighbor cell list for UE 120).

As shown by reference number 735, BS 110-S may determine a measurement gap configuration (e.g., an updated measurement gap length and/or periodicity, a modified measurement gap length and/or periodicity, and/or the like) associated with UE 120.

For example, in some aspects, BS 110-S may determine a length of the measurement gap based at least in part on the serving cell measurement report. Here, BS 110-S may determine a signal characteristic (e.g., a signal strength, a signal quality, and/or the like), associated with the serving cell, based at least in part on the serving cell measurement report. In this example, if the signal characteristic satisfies a first threshold (e.g., is above a first value, is within or above a first range of values, and/or the like), then BS 110-S may determine the length of the measurement gap as a first length (e.g., a short length). Similarly, if the signal characteristic satisfies a second threshold but does not satisfy the first threshold (e.g., is above a second value but below the first value, is within a second range of values, and/or the like), then BS 110-S may determine the length of the measurement gap as a second length (e.g., a medium length). Further, if the signal characteristic does not satisfy the second threshold (e.g., is below the second value, is within or below a third range of values, and/or the like), then BS 110-S may determine the length of the measurement gap as a third length (e.g., a long length).

As another example, in some aspects, BS 110-S may determine a periodicity of the measurement gap based at least in part on the serving cell measurement report. Here, 110-S may determine a signal characteristic, associated with the serving cell, based at least in part on the serving cell measurement report. In this example, if the signal characteristic satisfies a first threshold (e.g., is above a first value, is within or above a first range of values, and/or the like), then BS 110-S may determine the periodicity of the measurement gap as a first periodicity (e.g., a long periodicity). Similarly, if the signal characteristic satisfies a second threshold but does not satisfy the first threshold (e.g., is above a second value but below the first value, is within a second range of values, and/or the like), then BS 110-S may determine the periodicity of the measurement gap as a second periodicity (e.g., a medium periodicity). Further, if the signal characteristic does not satisfy the second threshold (e.g., is below the second value, is within or below a third range of values, and/or the like), then BS 110-S may determine the periodicity of the measurement gap as a third periodicity (e.g., a short periodicity).

In some aspects, BS 110-S may determine the length of the measurement gap and the periodicity of the measurement gap based at least in part on the serving cell measurement report. In other words, in some aspects, BS 110-S may improve the neighbor cell selection process by adjusting both the length and the periodicity.

In some aspects, determining the length and/or the periodicity of the measurement gap based at least in part on the serving cell measurement report may improve the neighbor cell search process. For example, by using a comparatively shorter measurement gap and/or a comparatively longer periodicity in good channel conditions (i.e., when a likelihood of a need for cell reselection and/or handover is reduced), an amount of resources used for neighbor cell searching may be reduced, while also improving throughput at UE 120. As another example, by using a comparatively longer measurement gap and/or a comparatively higher periodicity in poor channel conditions (i.e., when a likelihood of a need for cell reselection and/or handover is increased), faster cell reselection and/or handover may be achieved (e.g., by permitting a greater number of scans in a given measurement gap), while also reducing a likelihood of a dropped call and/or lost connection at UE 120.

As shown by reference number 740, BS 110-S may provide the second neighbor cell list and information associated with the measurement gap configuration to UE 120. In some aspects, BS 110-S may provide the second neighbor cell list and/or the information associated with the measurement gap configuration via an item of system information, a control channel, a RRC message, and/or the like.

As shown by reference number 745, UE 120 may receive the second neighbor cell list and the information associated with the measurement gap configuration, and may store the second neighbor cell list and the measurement gap configuration such that UE 120 will perform later neighbor cell searches based at least in part on the second neighbor cell list and in accordance with the measurement gap configuration. For example, as shown by reference number 750, UE 120 may (e.g., at a later time) perform a neighbor cell search based at least in part on the second neighbor cell list and in accordance with the measurement gap configuration. In some aspects, the above described process may be repeated (e.g., periodically) in order to further update and/or modify the neighbor cell list and/or the measurement gap.

As indicated above, FIGS. 7A and 7B are provided as examples. Other examples are possible and may differ from what was described with respect to FIGS. 7A and 7B.

Figure 8:
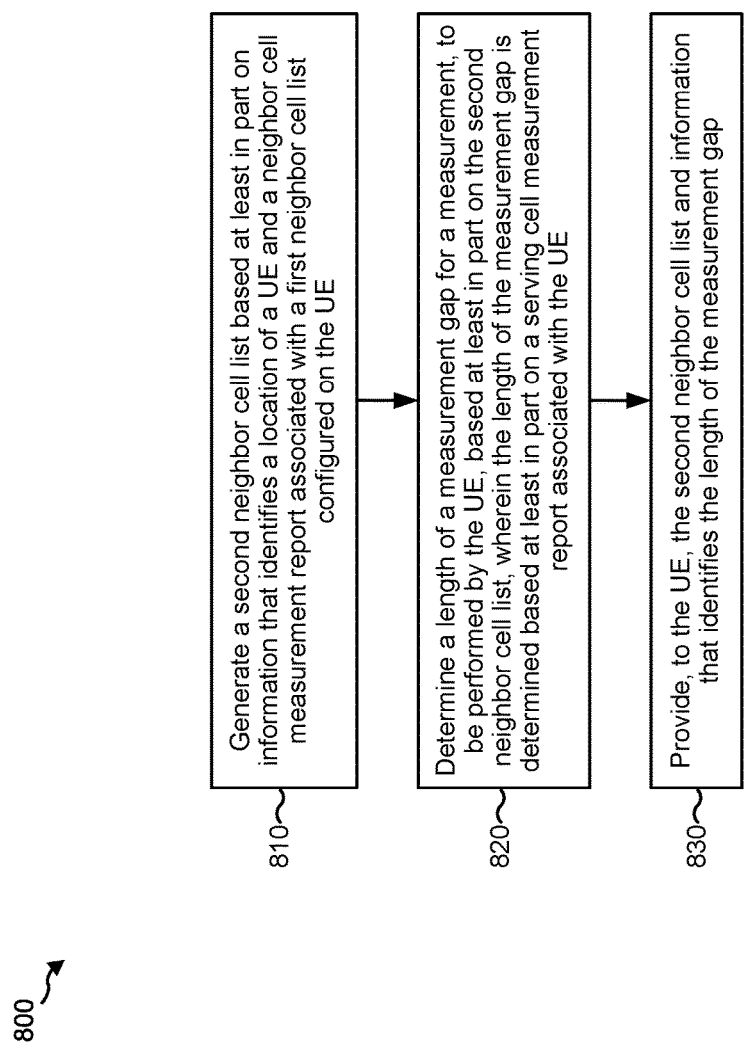
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a base station (e.g., BS 110) performs operations for improved neighbor selection in a cellular system, such as a 5G cellular system.

As shown in FIG. 8, in some aspects, process 800 may include generating a second neighbor cell list based at least in part on information that identifies a location of a UE and a neighbor cell measurement report associated with a first neighbor cell list configured on the UE (block 810). For example, the base station may generate a second neighbor cell list based at least in part on information that identifies a location of the UE and a neighbor cell measurement report associated with a first neighbor cell list configured on the UE, as described above.

As further shown in FIG. 8, in some aspects, process 800 may include determining a length of a measurement gap for a measurement, to be performed by the UE, based at least in part on the second neighbor cell list, wherein the length of the measurement gap is determined based at least in part on a serving cell measurement report associated with the UE (block 820). For example, the base station may determine a length of a measurement gap for a measurement, to be performed by the UE, based at least in part on the second neighbor cell list, wherein the length of the measurement gap is determined based at least in part on a serving cell measurement report associated with the UE, as described above.

As further shown in FIG. 8, in some aspects, process 800 may include providing, to the UE, the second neighbor cell list and information that identifies the length of the measurement gap (block 830). For example, the base station may provide, to the UE, the second neighbor cell list and information that identifies the length of the measurement gap, as described above.

In some aspects, the second neighbor cell list may be generated based at a least in part on determining a distance from the UE to one or more cells.

In some aspects, the second neighbor cell list may be generated based at least in part on a set of neighbor cell scores corresponding to a set of cells. Here, a neighbor cell score, of the set of neighbor cell scores, may be determined based at least in part a combination of a distance from the UE to a particular cell, of the set of cells, and a signal strength associated with the particular cell. The signal strength, associated with the particular cell, may be identified in the neighbor cell measurement report.

In some aspects, a periodicity of the measurement gap may be determined based at least in part on the serving cell measurement report. Here, information that identifies the periodicity of the measurement gap may be provided to the UE.

In some aspects, the length of the measurement gap may be determined based at least in part on whether a signal strength, identified in the serving cell measurement report, satisfies a threshold.

In some aspects, the neighbor cell measurement report may be received from the UE based at least in part on measurements, performed by the UE, associated with the first neighbor cell list.

In some aspects, the serving cell measurement report may be received from the UE based at least in part on a measurement, performed by the UE, associated with the serving cell.

In some aspects, the information that identifies the location of the UE may be received from the UE.

Although FIG. 8 shows example blocks of process 8, in some aspects, process 8 may include additional blocks, fewer blocks, different blocks, or differently arranged blocks than those depicted in FIG. 8. Additionally, or alternatively, two or more of the blocks of process 8 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
   generating a second neighbor cell list based at least in part on information that identifies a location of a user equipment (UE) and a neighbor cell measurement report associated with a first neighbor cell list configured on the UE;
   determining a length of a measurement gap for a measurement, to be performed by the UE, based at least in part on the second neighbor cell list,
      wherein the length of the measurement gap is determined based at least in part on a serving cell measurement report associated with the UE; and
   providing, to the UE, the second neighbor cell list and information that identifies the length of the measurement gap.

2. The method of claim 1, wherein the second neighbor cell list is generated based at a least in part on determining a distance from the UE to one or more cells.

3. The method of claim 1, wherein the second neighbor cell list is generated based at least in part on a set of neighbor cell scores corresponding to a set of cells,
   wherein a neighbor cell score, of the set of neighbor cell scores, is determined based at least in part a combination of a distance from the UE to a particular cell, of the set of cells, and a signal strength associated with the particular cell,
      wherein the signal strength, associated with the particular cell, is identified in the neighbor cell measurement report.

4. The method of claim 1, wherein a periodicity of the measurement gap is determined based at least in part on the serving cell measurement report,
   wherein information that identifies the periodicity of the measurement gap is provided to the UE.

5. The method of claim 1, wherein the length of the measurement gap is determined based at least in part on whether a signal strength, identified in the serving cell measurement report, satisfies a threshold.

6. The method of claim 1, wherein the neighbor cell measurement report is received from the UE based at least in part on measurements, performed by the UE, associated with the first neighbor cell list.

7. The method of claim 1, wherein the serving cell measurement report is received from the UE based at least in part on a measurement, performed by the UE, associated with a serving cell.

8. The method of claim 1, wherein the information that identifies the location of the UE is received from the UE.

9. A wireless communication device, comprising:
   a memory; and
   one or more processors, operatively coupled to the memory, the one or more processors configured to:
      generate a second neighbor cell list based at least in part on information that identifies a location of a user equipment (UE) and a neighbor cell measurement report associated with a first neighbor cell list configured on the UE;
      determine a length of a measurement gap for a measurement, to be performed by the UE, based at least in part on the second neighbor cell list,
         wherein the length of the measurement gap is determined based at least in part on a serving cell measurement report associated with the UE; and
      provide, to the UE, the second neighbor cell list and information that identifies the length of the measurement gap.

10. The wireless communication device of claim 9, wherein the second neighbor cell list is generated based at a least in part on determining a distance from the UE to one or more cells.

11. The wireless communication device of claim 9, wherein the second neighbor cell list is generated based at least in part on a set of neighbor cell scores corresponding to a set of cells,
    wherein a neighbor cell score, of the set of neighbor cell scores, is determined based at least in part a combination of a distance from the UE to a particular cell, of the set of cells, and a signal strength associated with the particular cell,
       wherein the signal strength, associated with the particular cell, is identified in the neighbor cell measurement report.

12. The wireless communication device of claim 9, wherein a periodicity of the measurement gap is determined based at least in part on the serving cell measurement report,
    wherein information that identifies the periodicity of the measurement gap is provided to the UE.

13. The wireless communication device of claim 9, wherein the length of the measurement gap is determined based at least in part on whether a signal strength, identified in the serving cell measurement report, satisfies a threshold.

14. The wireless communication device of claim 9, wherein the neighbor cell measurement report is received from the UE based at least in part on measurements, performed by the UE, associated with the first neighbor cell list.

15. The wireless communication device of claim 9, wherein the serving cell measurement report is received from the UE based at least in part on a measurement, performed by the UE, associated with a serving cell.

16. The wireless communication device of claim 9, wherein the information that identifies the location of the UE is received from the UE.

17. A non-transitory computer-readable medium storing one or more instructions for wireless communication, the one or more instructions comprising:
    one or more instructions that, when executed by one or more processors of a wireless communication device, cause the one or more processors to:
       generate a second neighbor cell list based at least in part on information that identifies a location of a user equipment (UE) and a neighbor cell measurement report associated with a first neighbor cell list configured on the UE;
       determine a length of a measurement gap for a measurement, to be performed by the UE, based at least in part on the second neighbor cell list, wherein the length of the measurement gap is determined based at least in part on a serving cell measurement report associated with the UE; and provide, to the UE, the second neighbor cell list and information that identifies the length of the measurement gap.

18. The non-transitory computer-readable medium of claim 17, wherein the second neighbor cell list is generated based at a least in part on determining a distance from the UE to one or more cells.

19. The non-transitory computer-readable medium of claim 17, wherein the second neighbor cell list is generated based at least in part on a set of neighbor cell scores corresponding to a set of cells, wherein a neighbor cell score, of the set of neighbor cell scores, is determined based at least in part a combination of a distance from the UE to a particular cell, of the set of cells, and a signal strength associated with the particular cell, wherein the signal strength, associated with the particular cell, is identified in the neighbor cell measurement report.

20. The non-transitory computer-readable medium of claim 17, wherein a periodicity of the measurement gap is determined based at least in part on the serving cell measurement report, wherein information that identifies the periodicity of the measurement gap is provided to the UE.

21. The non-transitory computer-readable medium of claim 17, wherein the length of the measurement gap is determined based at least in part on whether a signal strength, identified in the serving cell measurement report, satisfies a threshold.

22. The non-transitory computer-readable medium of claim 17, wherein the neighbor cell measurement report is received from the UE based at least in part on measurements, performed by the UE, associated with the first neighbor cell list.

23. The non-transitory computer-readable medium of claim 17, wherein the serving cell measurement report is received from the UE based at least in part on a measurement, performed by the UE, associated with a serving cell.

24. An apparatus for wireless communication, comprising:

means for generating a second neighbor cell list based at least in part on information that identifies a location of a user equipment (UE) and a neighbor cell measurement report associated with a first neighbor cell list configured on the UE;

means for determining a length of a measurement gap for a measurement, to be performed by the UE, based at least in part on the second neighbor cell list, wherein the length of the measurement gap is determined based at least in part on a serving cell measurement report associated with the UE; and means for providing, to the UE, the second neighbor cell list and information that identifies the length of the measurement gap.

25. The apparatus of claim 24, wherein the second neighbor cell list is generated based at a least in part on determining a distance from the UE to one or more cells.

26. The apparatus of claim 24, wherein the second neighbor cell list is generated based at least in part on a set of neighbor cell scores corresponding to a set of cells, wherein a neighbor cell score, of the set of neighbor cell scores, is determined based at least in part a combination of a distance from the UE to a particular cell, of the set of cells, and a signal strength associated with the particular cell, wherein the signal strength, associated with the particular cell, is identified in the neighbor cell measurement report.

27. The apparatus of claim 24, wherein a periodicity of the measurement gap is determined based at least in part on the serving cell measurement report, wherein information that identifies the periodicity of the measurement gap is provided to the UE.

28. The apparatus of claim 24, wherein the length of the measurement gap is determined based at least in part on whether a signal strength, identified in the serving cell measurement report, satisfies a threshold.

29. The apparatus of claim 24, wherein the neighbor cell measurement report is received from the UE based at least in part on measurements, performed by the UE, associated with the first neighbor cell list.

30. The apparatus of claim 24, wherein the information that identifies the location of the UE is received from the UE.

* * * * *